US007978907B2

(12) United States Patent
Fukui et al.

(10) Patent No.: US 7,978,907 B2
(45) Date of Patent: Jul. 12, 2011

(54) IMAGE ANALYZER

(75) Inventors: Motofumi Fukui, Kanagawa (JP); Takashi Isozaki, Kanagawa (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 946 days.

(21) Appl. No.: 11/477,517

(22) Filed: Jun. 30, 2006

(65) Prior Publication Data

US 2007/0092134 A1 Apr. 26, 2007

(30) Foreign Application Priority Data

Oct. 26, 2005 (JP) ................................. 2005-310822

(51) Int. Cl.
*G06K 9/62* (2006.01)
(52) U.S. Cl. ........................................ 382/160; 382/155
(58) Field of Classification Search .................... 382/160
See application file for complete search history.

(56) References Cited

U.S. PATENT DOCUMENTS

| 4,712,248 | A  | * | 12/1987 | Hongo ........................... 382/199 |
| 2002/0159627 | A1 | * | 10/2002 | Schneiderman et al. ..... 382/154 |
| 2005/0013486 | A1 | * | 1/2005 | Wiedemann et al. ......... 382/181 |
| 2006/0098846 | A1 | * | 5/2006 | Kuwabara et al. ............ 382/107 |
| 2006/0133586 | A1 | * | 6/2006 | Kasai et al. ................. 379/88.12 |
| 2008/0219502 | A1 | * | 9/2008 | Shamaie ....................... 382/103 |

FOREIGN PATENT DOCUMENTS

| JP | A 08-044490 | 2/1996 |
| JP | A 2002-288640 | 10/2002 |
| JP | 2004-303014 | 10/2004 |

OTHER PUBLICATIONS

Bradski, Gary R. et al., "Computer Vision Face Tracking for Use in a Perceptual User Interface," Intel Technology Journal Q2, pp. 1-15, 1998.
Jensen, Finn V. et al., "Bayesian Networks and Decision Graphs," Statistics for Engineering and Information Science, pp. 26-27, pp. 174-175, pp. 188-189, 2001.
U.S. Appl. No. 11/338,807, filed Jan. 25, 2006; Motofumi Fukui et al.
Higuchi, Mirai et al. "Recognition of Human Actions and Related Objects based on Cooperative Bayesian Networks." The Special Interest Group Notes of Information Processing Society of Japan, vol. 2005 No. 18, pp. 117-124. IPSJ SIG Technical Reports, Japan. Mar. 4, 2005. (with English Abstract).
Office Action issued in JP Application No. 2005-310822 on Dec. 7, 2010 (with English translation).

* cited by examiner

*Primary Examiner* — Brian P Werner
*Assistant Examiner* — Nirav G Patel
(74) *Attorney, Agent, or Firm* — Oliff & Berridge, PLC

(57) ABSTRACT

An image analyzer for detecting a target object from image data, includes a reference detection unit, a primary detection unit, a secondary detection unit and an output unit. The reference detection unit detects a reference object included in the image data. The primary detection unit detects candidates for the target object from the image data. The secondary detection unit specifies a portion including the target object from among the candidates, by using a correlation between a feature of the detected reference object and a feature of the candidates. The output unit outputs information representing the portion including the target object specified by the secondary detection unit.

12 Claims, 6 Drawing Sheets x, y: COORDINATE AXES OF IMAGE DATA

IMAGE ANALYZER

CROSS-REFERENCE TO THE RELATED APPLICATION

This application claims priority under 35 U.S.C. §119 from Japanese patent application No. 2005-310822 filed on Oct. 26, 2005, the disclosure of which is incorporated by reference herein.

BACKGROUND

1. Field

The invention relates to an image analyzer for detecting a target object, such as the hands of a person, from image data.

2. Related Art

Ascertaining actions of a person whose image has been captured by means of detecting motions of the hands of the person has been studied.

SUMMARY

According to an aspect of the invention, an image analyzer for detecting a target object from image data, includes a reference detection unit, a primary detection unit, a secondary detection unit and an output unit. The reference detection unit detects a reference object included in the image data. The primary detection unit detects candidates for the target object from the image data. The secondary detection unit specifies a portion including the target object from among the candidates, by using a correlation between a feature of the detected reference object and a feature of the candidates. The output unit outputs information representing the portion including the target object specified by the secondary detection unit.

BRIEF DESCRIPTION OF THE DRAWINGS

Exemplary embodiments of the invention will be described in detail based on the following figures, wherein.

DETAILED DESCRIPTION

Figure 1:
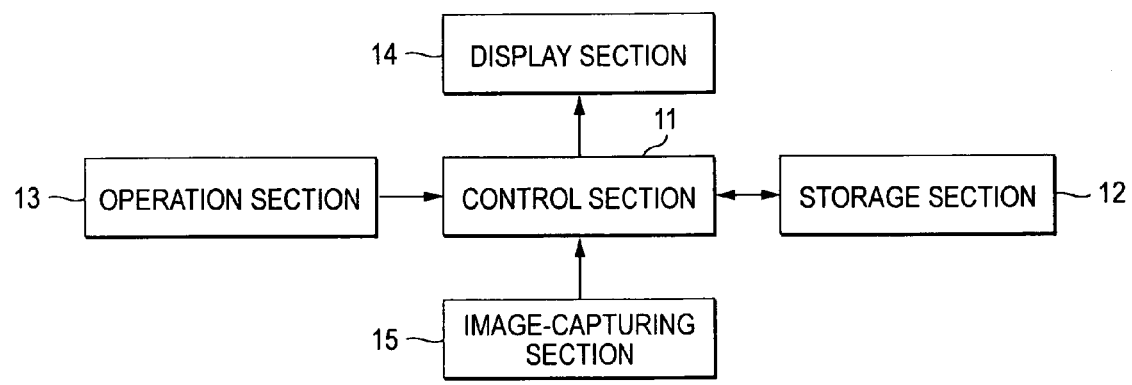
FIG. 1 is a structural block diagram showing an example of an image analyzer according to an exemplary embodiment of the invention.

An exemplary embodiment of the invention will be described by reference to the drawings. As shown in FIG. 1, an image analyzer according to the exemplary embodiment of the invention includes a control section 11, a storage section 12, an operation section 13, a display section 14, and an image-capturing section 15.

The control section 11 is a program control device, such as a CPU, and operates in accordance with a program stored in the storage section 12. In this exemplary embodiment, the control section 11 performs processing for detecting a reference object from image data, which is a process target, and processing for specifying the target object by using a correlation between a feature of the reference object and that of the target object. Details of specific processing of the control section 11 will be described later.

The storage section 12 is a computer-readable recording medium including a memory element such as RAM (Random Access Memory). A program to be executed by the control section 11 is stored in this storage section 12. This storage section 12 operates as working memory of the control section 11.

The operation section 13 is a keyboard or a mouse. Upon receipt of command operation input by the user, the operation section 13 outputs specifics of the command operation to the control section 11. The display section 14 is a display or the like, and displays information in accordance with the command input from the control section 11. The image-capturing section 15 is a camera or the like, and sequentially outputs to the control section 11 static images captured at predetermined timings.

In this exemplary embodiment, the control section 11 detects a target object with using respective static images captured by the image-capturing section 15 as image data, which will be subjected to the process. The following descriptions are provided on condition that the target object is the human's hands.

Figure 2:
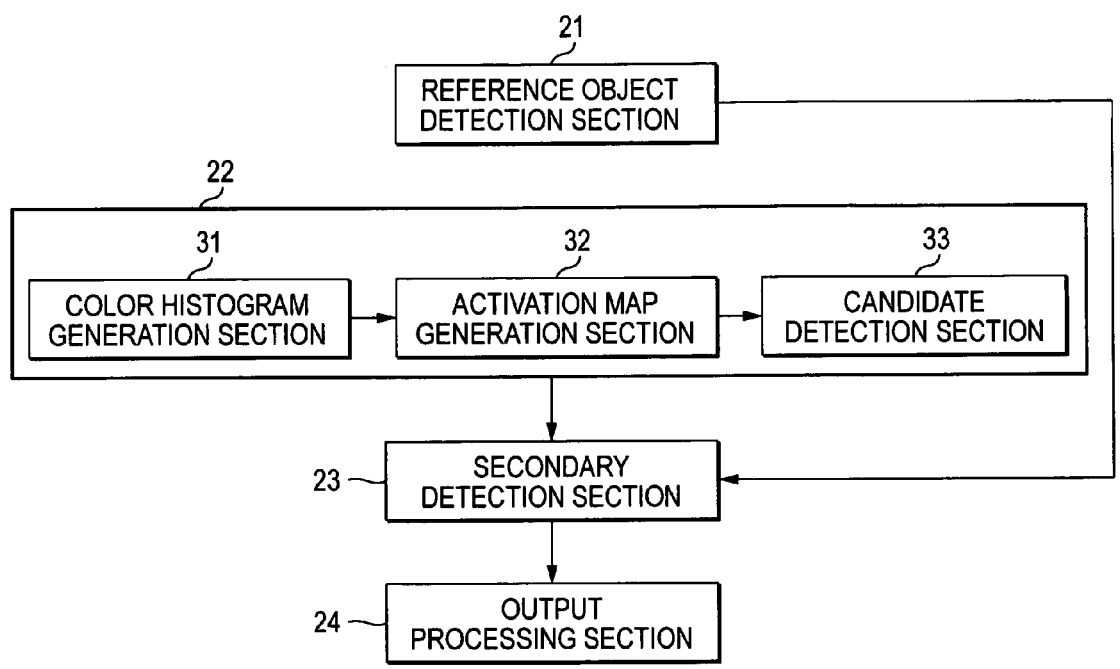
FIG. 2 is a functional block diagram showing the example of the image analyzer according to the exemplary embodiment of the invention.

As a result of the control section 11 executing the program stored in the storage section 12, the image analyzer of this exemplary embodiment functionally includes a reference object detection section 21, a primary detection section 22, a secondary detection section 23, and an output processing section 24, as shown in FIG. 2. In this exemplary embodiment, the primary detection section 22 includes a color histogram generation section 31, an activation map generation section 32, and a candidate detection section 33.

The reference object detection section 21 takes one of static images output by the image-capturing section 15 as image data in question, and detects and specifies an image portion (a reference object), which serves as a reference, from the image data in question. The reference object is an image portion having a target object, which has been set in advance by the user. For example, the reference object may be the face of a person or a white board located in the background (in the case of a white board, conditions may be defined as a white region having predetermined area or more within a predetermined domain). Heretofore-developed face recognition processing can be applied to a case where the face of a person is specified by way of an example. In this exemplary embodiment, the face of a person is detected as a reference object. When the reference object detection section 21 has failed to detect the face of the person as a reference image from image data, processing of the primary detection section 22 or processing of the secondary detection section 23 is not necessarily carried out. The reference object detection section 21 outputs to the primary detection section 22 and the secondary detection section 23 information (coordinate information including a face portion) used for specifying an area where the detected face is captured.

The primary detection section 22 detects, as a detection target candidate, a candidate for a hand, which is an object to be detected from the image data to be subjected to the processing. In this exemplary embodiment, an image portion of the face is detected as a reference image. Hence, the primary detection section 22 detects a candidate for an image of a hand by using information about the color of the image portion of the face.

The color histogram generation section 31 of the primary detection section 21 of this exemplary embodiment generates a histogram (a color histogram of a face portion) of pixel values included in the image portion detected by the reference object detection section 21 from the image data to be subjected to the processing. Then, the color histogram generation section 31 stores the thus generated histogram into the storage section 12.

The activation map generation section 32 sequentially selects pixels of the image data to be subjected to the processing, as a pixel in question. The activation map generation section 32 generates a map (an activation map) representing how closely a pixel in question matches a skin color, by using a frequency value of a bin corresponding to a pixel value of the pixel in question in the color histogram stored in the storage section 12. In the activation map, data values, which are equal in size to original image data, are arranged two-dimensionally and a data value corresponding to the pixel in question is taken as a value of the map. For instance, it is assumed that a frequency value of a pixel value (Ri, Gi, Bi) in an RGB color space is "x" in the color histogram. In this case, the pixel in question having the pixel value (Ri, Gi, Bi) has a value X in the activation map (a so-called back projection type). This activation map may be generated by using a correlation value method in which an inverse of a distance between the mode of the skin color and the frequency value in the color space is taken as a value on the map. Moreover, in relation to the person whose color data have been obtained through image-capturing, a color distribution may be acquired, through learning, from previously-registered face image data and an unspecified number of pieces of face image data. The activation map may be generated from the color distribution. The activation map generation section 32 stores the thus-generated activation map into the storage section 12.

The candidate detection section 33 selects pixels having averagely-high values by reference to the values of the activation map. For instance, in a matrix of data values on the activation map, the candidate detection section 33 selects blocks each having a 3 [pixel]×3 [pixel] subwindow from the upper left corner sequentially. Then, the candidate detection section 33 selects the block having the 3 [pixel]×3 [pixel] subwindow while moving the block by one pixel rightward. The candidate detection section 33 calculates an average value of the 3 [pixel]×3 [pixel] subwindow included in each block, and associates the thus-computed average value with the center data value of the 3 [pixel]×3 [pixel] subwindow and stores it into the storage section 12 as an average degree of activity. When the block reaches the right end, the candidate detection section 33 moves the block downward by one pixel, and then selects blocks sequentially while moving a block again sequentially made from the left to the right one pixel by one pixel, and performs similar processing. Consequently, the candidate detection section 33 generates an average activity map.

Figure 3:
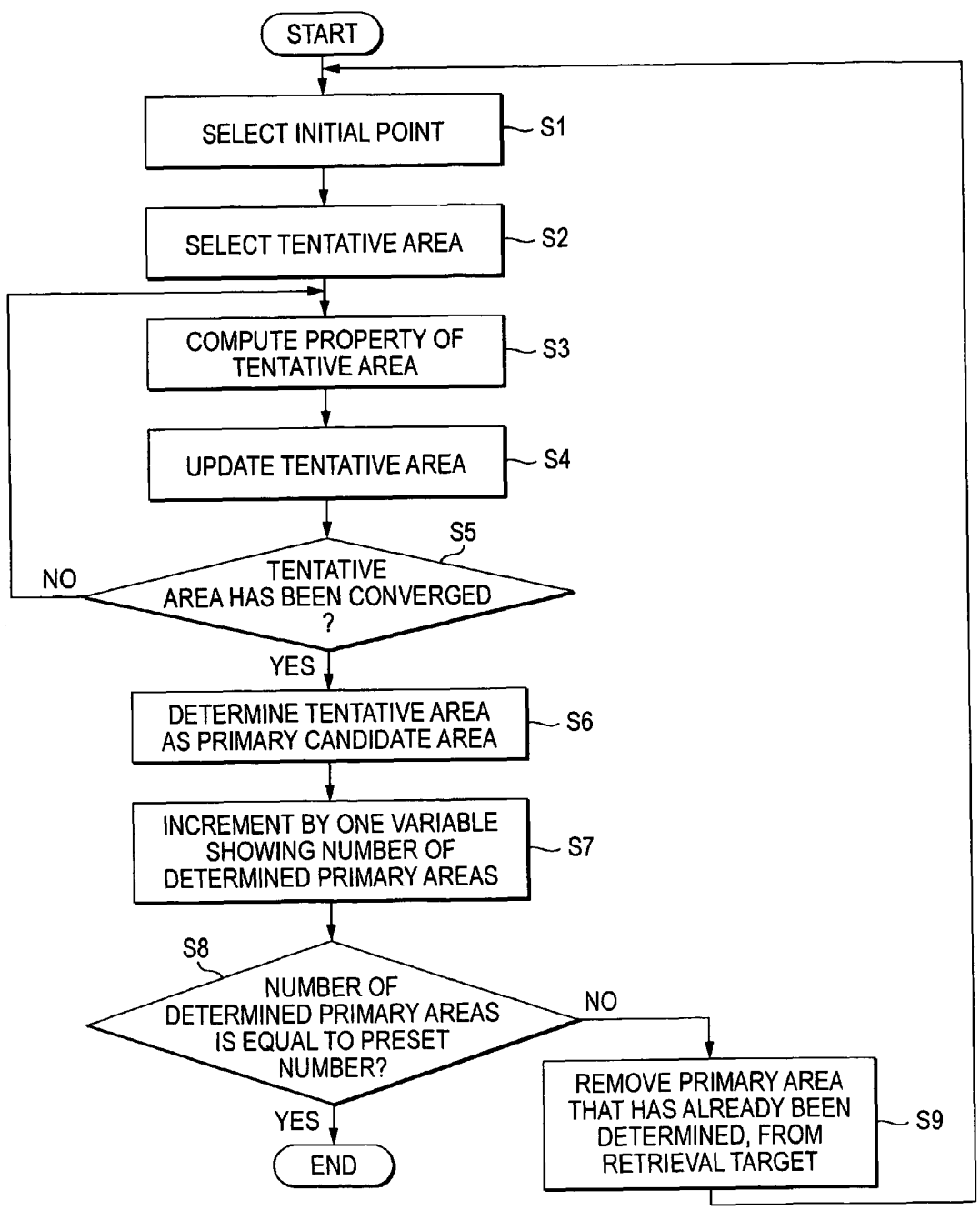
FIG. 3 is a flowchart showing example operation of a primary detection section in the image analyzer according to the exemplary embodiment of the invention.

The candidate detection section 33 computes properties of the candidate areas (e.g., height, width, position and inclination) by means of an algorithm described in U.S. patent application Ser. No. 11/338,807, the disclosure of which is incorporated by reference herein. The candidate detection section 33 initiates processing shown in FIG. 3, and first sets a variable showing an identification number to 0. The candidate detection section 33 selects a position of the data value, where an average activity is maximum on the average activity map, as an initial point (S1). Further, the candidate detection section 33 selects an area, which has a predetermined initial size and is centered on the initial point, as a tentative area (S2). Then, the candidate detection section 33 calculates a property of the tentative area. The property may include width, height, the centroid position and inclination of the tentative area. A type of this algorithm has been already proposed in U.S. patent application Ser. No. 11/338,807 (client reference number FE05-03985US01), entire contents of which are incorporated herein by reference in its entirety. Here, the centroid can be obtained by the following equations (S3).

The candidate detection section 33 determines a new tentative area, which is a rectangular area having a new property estimated in S3 (S4). Then, the candidate detection section 33 determines as to whether or not the new tentative area has the same property as the last tentative area (S5). If the new property is the same as that of the previous (last) tentative area (the new tentative area converges on the previous area), the candidate detection section 33 determines the tentative area as a primary candidate area, and stores the property of the thus-determined primary candidate area in the storage section 12 (S6). The candidate detection section 33 associates a value of a variable representing the identification number is associated, as an identifier, with information representing a primary candidate area. Then, the candidate detection section 33 increments the value of the variable by one (S7).

The candidate detection section 33 further selects an initial point except the primary candidate area that has already been determined, to thereby determine a plurality of primary candidate areas. Here, it is assumed that the number of primary candidate areas has previously been set to N. In this case, the candidate detection section 33 examines whether or not the number of selected primary candidate areas (the value of a variable achieved after the incrementation) has reached the set number N (S8). If the set number N has been achieved, processing will be completed.

When the candidate detection section 33 determines that the number of selected primary candidate areas is less than the set number N through processing at S8, the candidate detection section 33 executes processing for removing the primary candidate area that has already been determined (e.g., processing for setting the data value of the area, which has already been determined as a primary candidate area, to "0" on the activation map and the average activity map) (S9). The candidate detection section 33 returns to S1, and continues processing.

The parameter N, which is used in the determination at S8, may be determined in consideration of a relationship with a computing speed. For instance, it is assumed that the image-capturing section 15 captures 18 frames of static images per second and outputs the thus-captured images (a frame rate is 0.0556 seconds/frame), and that time period required to determine one primary candidate area is only several milliseconds or thereabouts, the time required to determine all the primary candidate areas for one frame is estimated to be less than 0.04 seconds (a frame rate of less than 0.0556 seconds/frame). Therefore, N may be set to 4.

Processing described as a CamShift method in "Computer Vision Face Tracking For Use in a Perceptual User Interface" (Gary r. Bradski, Intel Technology Journal Q2, 1998) is applied to processing executed by the candidate detection section 33 from S1 to S6. Also, any other method may be used so long as it can detect a plurality of areas considered to be the hands.

Even when the CamShift method is used, the aspect ratio of the rectangular candidate area can not be estimated. However, introducing the proposed algorithm in U.S. patent application Ser. No. 11/338,807, the property can be estimated easily.

The secondary detection section 23 specifies a portion including the target object from among the detection target candidates, by using a correlation between a feature of the detected reference object and a feature of the candidates Here, it is assumed that the second detection section 23 uses a Bayesian network, which can actively utilize a dependence relation among a plurality of feature dimensions, which are obtained beforehand as knowledge.

The Bayesian network is called graphical modeling (see "Graphical Models in Applied Multivariate Statistics," (Whittaker, J., John Wiley and Sons (1990)). A set of "n" ("n" is a natural number) random variables $\{X1, \ldots Xn\}$ is expressed by a directed acyclic graph in which a direct conditional dependency relation (causal relation) among the random variables, which are elements of the set, is connected by directed links. Since the graph is the directed acyclic graph, if the directed links are followed from an arbitral random variable, we cannot return to the original random variable. Also, values of the respective random variables may be discrete or consecutive.

In the Bayesian network, the network structure can be expressed by using such a graph. Respective random variables will be hereinafter called nodes, and the directed links will be hereinafter called edges. When one edge enters an node Xi, a node (may be singular or plural) from which the edge extends is called a parent node of the node Xi and labeled Pa(Xi).

Dependence pertaining to the random variable Xi in this case is expressed by conditional probability using the value xi, which is the random variable of the node Xi $$P(x_i | Pa(x_i)) \qquad (1).$$

A joint probability distribution pertaining to the entire random variables is expressed by a product of conditional probability, that is:

$$P(x_1, \ldots, X_n) = \prod_{i=1}^{n} P(x_i | Pa(x_i)) \qquad (2)$$

This exemplary embodiment employs, as random variables, information used for specifying an area, which has been detected as a hand (a target object) in an immediately-preceding frame (e.g., an identifier associated with information representing respective primary candidate areas); information used for specifying a primary candidate area, which is proximal to the area detected as the hand (a target object) in the immediately-preceding frame and which is located in the image data that is currently subjected to the processing; information used for specifying a primary candidate area determined as a hand (a target object) within the image data that is currently subjected to the processing; and a group of characteristic nodes of the respective primary candidate areas.

Information used for specifying the area detected as a hand involves two nodes for the respective right and left hands. The group of characteristic nodes includes (A) an aspect ratio of a primary candidate area; (B) a ratio of the area of the reference object to the area of the primary candidate area; (C) information showing a relative position between the reference object and the primary candidate area; (D) a distance between the reference object and the primary candidate area; (E) an inclination of the primary candidate area; (F) the intensity of a skin color (a data value of the activation map generated by the primary detection section 22); (G) the number of cluster centroids belonging to the candidate; (H) the number of shared clusters having the common domain with the candidate; (I) an average intensity value; (J) a variance of intensity; (K) an average intensity edge value; (L) an average color edge value "a" on lab color space; and (M) an average color edge value "b" on lab color space. It is noted that these image clusters are generated by K-Means algorithm using 5-dimensional feature vector according to each pixel, that is $(x, y, l, a, b)^t$.

Figure 4:
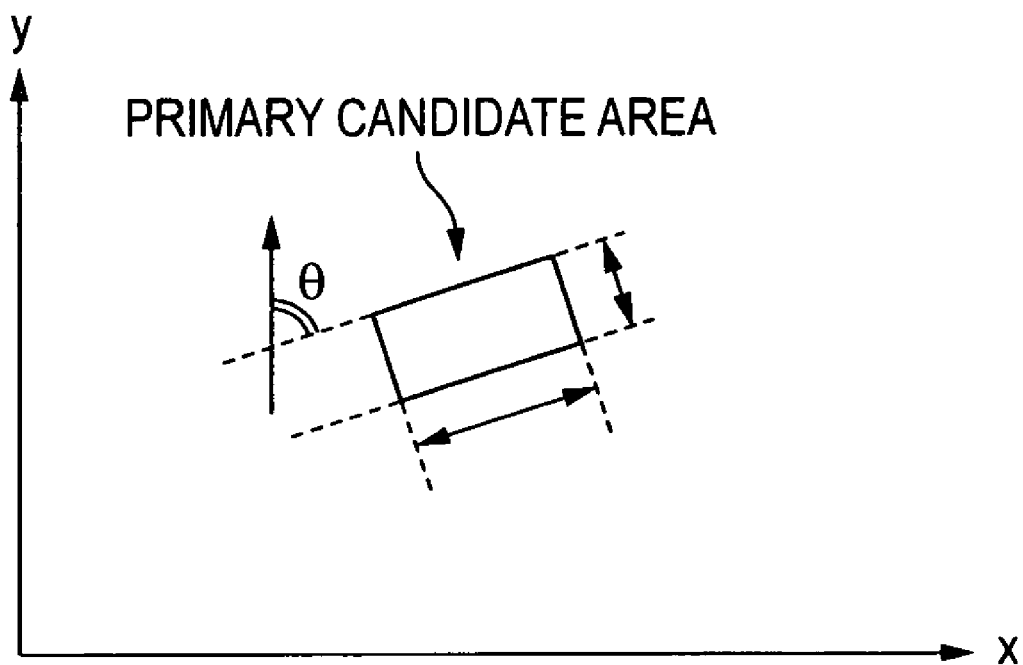
FIG. 4 is a descriptive view showing an example shape of a primary candidate area defined by the image analyzer according to the exemplary embodiment of the invention.

The aspect ratio of the primary candidate area (A) is a ratio of the vertical size of the primary candidate area to the horizontal size thereof (h/w, where "h" denotes a longitudinal length, and "w" denotes a horizontal length). As shown in FIG. 4, a side, which forms an angle θ with respect to the vertical axis of the image in a range of $0 \leq \theta \leq \pi/2$, is taken as a horizontal direction.

The ratio (B) of the area of the reference object to the area of the primary candidate area is obtained by dividing w×h by the area of the reference object.

The information (C) showing the relative position between the reference object and the primary candidate area is binary data representing whether the center of the primary candidate area is present in an upper position or a lower position with respect to a coordinate "y" of the center of the reference object.

Figure 5:
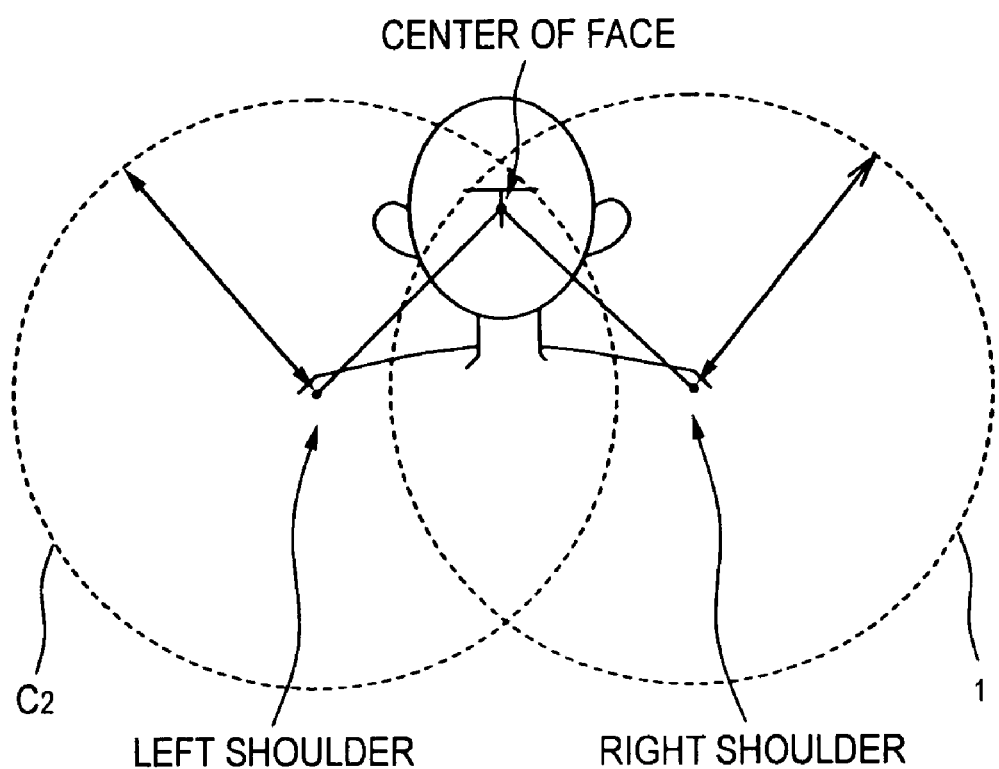
FIG. 5 is a descriptive view showing an example setting of a relative positional relationship between the face and the hands in the image analyzer according to the exemplary embodiment of the invention.

The distance (D) between the reference object and the primary candidate area may be a distance related to coordinates between the center of the reference object and the center of the primary candidate area. Alternatively, the distance (D) may be defined as follows because an area where the face is captured is detected as the reference object in this exemplary embodiment. Specifically, as shown in FIG. 5, the relative positions of the right and left shoulders are estimated from the face, which has been captured as the reference object. Then, drawn are two circles C1, C2, have centers at the estimated positions of the respective right and left shoulders and have, as radii, a length "r" that has been determined as a virtual length of an arm in advance. The distance (D) is a value representing whether or not the primary candidate area falls within the circles C1 and C2.

The value θ of the inclination is used as the inclination (E) of the primary candidate area. The intensity of the skin color (F) corresponds to a pixel included in the primary candidate area, and is normalized by dividing the sum of data values of the activation map calculated by the primary detection section 22 by the area of the primary candidate area.

The number of cluster centroids (G) is a value representing the number of cluster centroids in the primary candidate area. The clusters are determined by dividing the image data to be subjected to the processing, into a plurality of areas (clusters) in advance. The number of shared clusters (H) represents the total number of clusters, which overlap the primary candidate area.

The average intensity value (I) is an average of the intensity values (L-value on lab color space) of the pixel values corresponding to the primary candidate area. The intensity variance (J) is a variance of intensity. The average intensity edge value (K) is an average value of the intensity edge values in the area corresponding to the primary candidate area. Likewise, the average color edge value "a" (L) and the average color edge value "b" (M) are an average value of color edge values within the area corresponding to the primary candidate area. Although "a" and "b" of the La*b** space have been used as an example of the color space, any color space may be used in accordance with a feature of the color of the target object.

Except for the information (C) representing the relative position between the reference image area and the (primary) candidate area, each feature value according to the other nodes are quantized. In the case of dividing into four parts, this value is denoted as 0, 1, 2 or 3, by using a rule based on the distribution or a choice criterion made by prior learning data. Information (C) representing the relative position between the reference image area and the primary candidate region is a binary value, and hence takes 0 or 1.

In this exemplary embodiment, the target object is the hands of a person and their positions are movable with time. In this Bayesian network of the secondary detection section 23, a causal relation is set with dynamic nodes and static nodes being distinguished from each other. The dynamic nodes are random variables based on information about the motion of the target object. The static nodes are random variables based on information, which has no relation to the motion of the target object.

Figure 6:
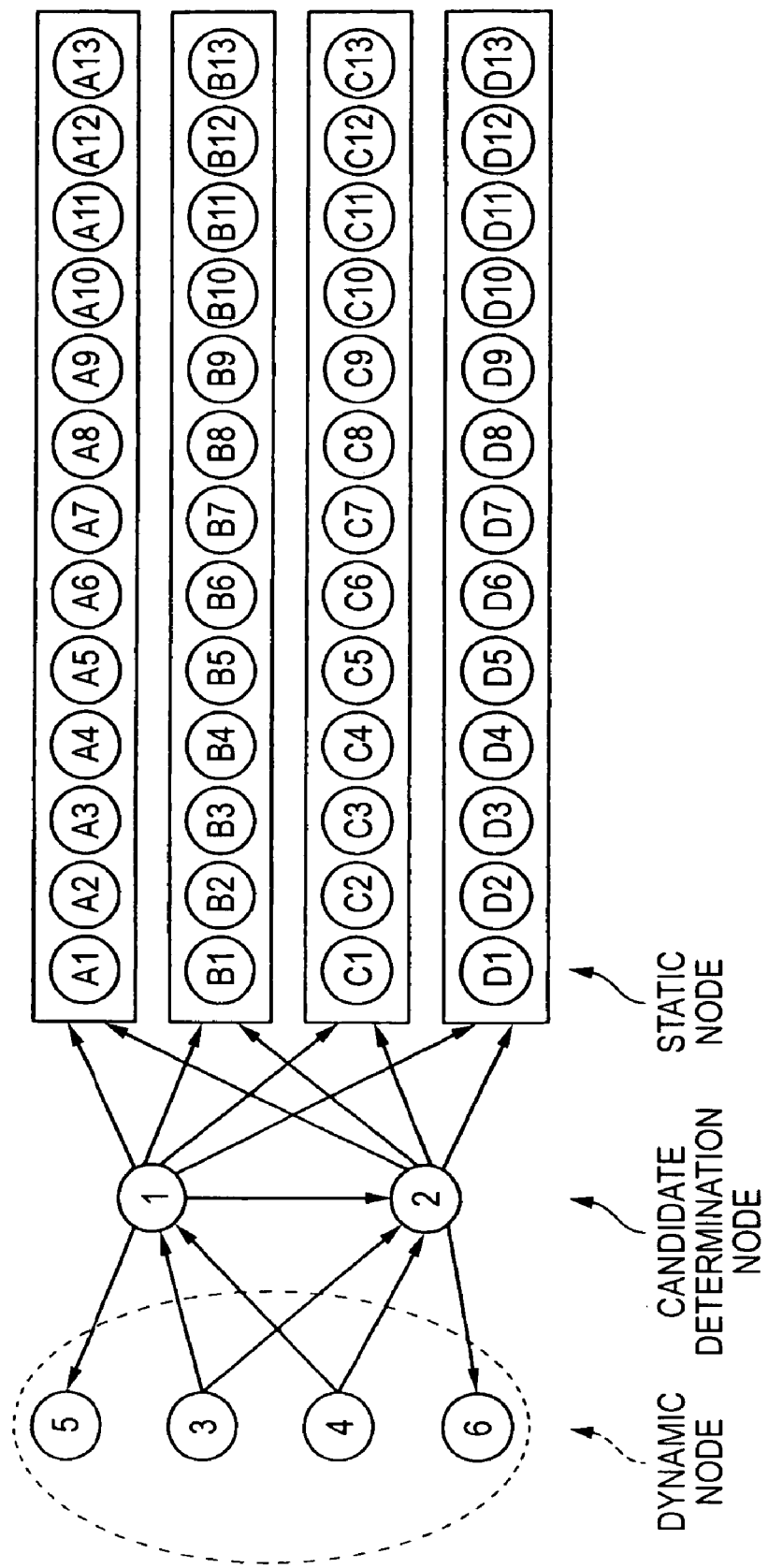
FIG. 6 is a descriptive view showing an example configuration of a Bayesian network used in a secondary detection section of the image analyzer according to the exemplary embodiment of the invention.

FIG. 6 is a graph drawing showing an example of such a Bayesian network that distinguishes the dynamic nodes and the static nodes from each other. Nodes 1, 2 (the target object in the embodiment is the hands; the two hands are present in the image data, and hence two nodes are employed) representing identifiers associated with the primary candidate area including the target object are set as candidate determination nodes. Set are Nodes 3, 4 representing identifiers associated with the primary candidate areas, which have been recognized as the hands by the secondary detection section 23 on the basis of the image data that are sequentially input from the image-capturing section 15 and have been input previous time. The causal relation is set from the respective nodes 3, 4 to the respective nodes 1, 2. The causal relation is set from node 1 to node 2. If the objects of detection have not been captured in the previous image data, the nodes 3, 4 are deleted.

Set are nodes 5, 6 representing the identifiers associated with the current primary candidate area located at the closest position to the primary candidate regions, which are recognized as hands previous time. The causal relation is set from the nodes 5 and 6 to the candidate determination nodes 1, 2, respectively.

A causal relation is set from both of the candidate determination nodes 1, 2, to the respective groups of characteristic nodes A1 to A13, B1 to B13, C1 to C13, and D1 to D13 generated in the areas (four areas in this exemplary embodiment) detected as the primary candidate areas.

As mentioned above, in this exemplary embodiment, areas including the objects of detection are specified by means of the Bayesian network including (a) the nodes 3, 4, 5, and 6 (dynamic nodes) based on information pertaining to the movement of the objects of detection; (b) a group of characteristic nodes (static nodes) based on the information, which have no direct relation to the movements of the objects of detection; and (c) the candidate determination nodes 1, 2. Here, the dynamic nodes and the static nodes are set so as to differ from each other in terms of a mode (a causal relation) of connection to each of candidate determination nodes.

The Bayesian network has been learned in advance by use of a previously-prepared learning sample. That is, before there is performed processing for recognizing a target object by use of actually-captured image data, each of the random variables is assumed to take a discrete finite value (any one of 0, 1, 2, 3, or 0 or 1) as described through a learning process. Also, the Dirichlet distribution, which is a conjugate distribution of a multinominal distribution serving as an a priori probability distribution relating to a node not having a parent node.

For instance, motion image data, which is a learning sample, is input to the control section 11. The primary candidate area is determined by the reference object detection section 21 and the primary detection section 22. An identifier associated with the primary candidate area, which actually includes a target object, among the primary candidate areas has been previously input to the control section 11 as the value of a correct answer.

The second detection section 23 calculates a conditional state-transition probability of each node by the following expression.

$$P(X_i^k \mid Pa(X_i)^j) = \frac{\alpha_{ijk} + N_{ijk}}{\sum_{k'} \alpha_{ijk'} + N_{ijk'}} \quad (3)$$

Here, $$X_i^k \quad (4)$$

denotes that the state of a random variable Xi of the node is "k".

$$Pa(Xi)^j \quad (5)$$

represent as "j" a combination of states of the group of parent nodes of Xi. Reference symbol "$\alpha_{ijk}$" designates a hyper parameter of the Dirichlet distribution. Reference symbol Nijk denotes the number of occurrences of a combination of states designated by (i, j, k). The hyper parameter $\alpha_{ijk}$ is set by the following equation so as to have a uniform priori distribution.

$$\alpha_{ijk} = \frac{1}{\text{state}(i)} \quad (6)$$

where state (i) represents number of states, which Xi can take. If there are deficient data, Nijk may be replaced with an expected value E[Nijk] and a conditional probability may be obtained by utilizing a so-called EM algorithm ("Maximum Likelihood from Incomplete Data via the EM algorithm," (A. Demster, et. al., Journal of the Royal Statistical Society, B39, pp. 1-38, 1977)).

By means of these procedures, the second detection section 23 learns what feature a primary candidate region, which includes a hand, has and what feature a primary candidate region, which does not include a hand, has.

If all the conditional probabilities required for inference can be determined through learning processing, a determination can be stochastically made as to whether or not each of the primary candidate areas includes the hands, which are objects of detection, by means of probability inference processing applied to the Bayesian network. A junction tree algorithm or a stochastic sampling technique using pseudo random numbers, which is one kind of clustering technique and has been known in "Bayesian Networks and Decision Graphs" (F. V. Jensen) is used for probability inference processing.

When probability inference processing is executed, the parent node is taken as a set of pieces of evidence, and conditional probability (posterior probability) is calculated with evidence being given. Posterior probability is calculated in relation to the nodes 1, 2 that are candidate determination nodes, and a state where the maximum posterior probability is taken is selected in each of these nodes 1, 2. In the nodes 1, 2, there can be adopted an identifier of the primary candidate area, a value representing that the hands are not in the image data of object, or a value representing that the hands are not present in the primary candidate area. The node 2 takes the node 1 as a parent node, and conditional probability is set such that the primary candidate area does not overlap the node 1. In other respects, there is selected a state where the maximum posterior probability is taken in the same manner as taken by the node 1. Thereby, the identifier of the primary candidate area where the hands are included with high probability is found in the nodes 1, 2.

When the secondary detection section 23 has found, among the primary candidate areas, an identifier of the primary candidate area that is determined to include the hands, which are objects of detection, with the highest probability, the output processing section 24 stores into the storage section 12 coordinate information about the primary candidate area specified by the identifier while associating the coordinate information with the image data, which is subjected to the processing.

The coordinate information is provided to predetermined processing, such as processing of calculating a moving speed of each hands on the basis of an interval between timings when consecutively-input image data are captured, and a travel distance of the hands.

According to the exemplary embodiment, image data consecutively captured by the image-capturing section 15 are consecutively input as objects of processing. From the image data to be subjected to the processing, the reference object detection section 21 specifies, e.g., a face portion of a person, as the reference object.

On the basis of a comparatively-small number of pieces of characteristic level information; e.g., color information, the primary detection section 22 selects, as primary candidate areas, a plurality of areas—where an image of a target object is captured—from the image data to be subjected to the processing.

On the basis of a comparatively-large number of pieces of characteristic information, such as a determination as to whether or not a detected area falls within the range of a predetermined distance from the reference position, which is set on the basis of, e.g., the area of the face portion, which is the reference image area, among the selected primary candidate areas, the second detection section 23 specifies the primary candidate area that is considered to include the target object with high probability. The area specified by the secondary detection section 23 is assumed to represent the position of the target object, and the area is output to the output processing section 24 and utilized for subsequent processing. As above, the accuracy of detection of objects of detection, such as the hands, can be enhanced by utilization of a correlation with the reference image area.

In the description provided thus far, the second detection section 23 performs processing by use of the Bayesian network illustrated in FIG. 6. However, the structure of the network is not limited to the Bayesian network. For instance, in the descriptions provided thus far, the following elements are used as random variables representing a correlation between the nature of the reference image area and that of the detection object candidate (the primary candidate area), which are included in the group of characteristic nodes. The elements include (B) a ratio of the area of the reference image area to the area of the primary candidate area; (C) information showing a relative position between the reference image area and the primary candidate area; and (D) a distance between the reference image area and the primary candidate area. In addition, an average intensity value (I) may be determined by a correlation with the reference image area, such as a difference or ratio of an average intensity value of the pixels included in the reference image area. Likewise, an average intensity edge value (K), an average color edge value "a" (L), an average color edge value "b" (M), and the like, may also utilize a relative color with respect to, e.g., a face color specified as the reference image area.

Further, (B) a ratio of the area of the reference image area to the area of the primary candidate area, (C) information showing a relative position between the reference image area and the primary candidate area; (D) a distance between the reference image area and the primary candidate area, and the like, may be in numbers when a plurality of reference image areas have been detected or when there are a plurality of objects of detection.

The descriptions provided thus far have mentioned the example where the hands are detected with the face being taken as a reference. Similarly, fingers, or the like, may be detected with arms or the hands (the backs of the hands or the like) being taken as a reference. Moreover, feet may be detected with the face or the hands being taken as a reference. The invention is not limited to the case where a human body or a body to be detected is taken as a reference, and can also be applied to a case where a body and a human body (e.g., an apparatus and a portion of the body of the user) having a relative positional relationship are taken as bodies to be detected or a case where another body differing from the body (e.g., the main body of a machine and a movable portion) is taken as an object to be detected.

Although the second detection section 23 has been described to utilize the Bayesian network, the second detection section 23 is not limited to the Bayesian network. For instance, processing, such as a hidden Markov model (HMM), a Markov chain Monte Carlo (MCMC) model, a boosting model, or the like, may be used as an other probability propagation model; or classifying equipment such as a support vector machine (SVM) may also be utilized.

Example

As an implementing example of the exemplary embodiment, the following processing is executed by way of experiment for the purpose of detecting movement of hands of a person who is captured with facing front. In the processing, the reference object detection section 21 detects a face of the person, and the Bayesian network shown in FIG. 6 is employed as the second detection section 23.

Also, at the time of learning, a total of 4,928 frames of static image data are processed by using five mutually-different motion images, so as to thus cause the network to learn conditional probability of each node. Further, a junction tree, which can provide a strict solution at comparatively high speed, is used as probability inference processing.

Image data under the test is motion picture data. The number of frames, from which the face can be extracted, is 1,609. Also, both hands always appear in the image (no occlusion).

As a comparative example, a rate of the case where the real hands are included in the top two areas with a strong probability of a hand all over the primary candidate areas (the rate similar to that in a general object extraction method such as CamShift method, which selects candidate areas number of which is equal to desired number) is 45.2%. A rate of the case where the hands are included in top four areas is 73.7%.

The accuracy of detection performed by the secondary detection section 23 is about 65.8%. When the accuracy of detection is experimentally determined from the Bayesian network shown in FIG. 6 with only the dynamic node being utilized, the accuracy of detection is about 49.3%. When motion information is added to this result, the accuracy of detection is enhanced. This shows that if a plurality of characteristics (static nodes) are utilized, the accuracy would be enhanced further.

What is claimed is:

1. An image analyzer for detecting a target object from image data, the image analyzer comprising:
   a reference detection unit that detects a reference object included in the image data;
   a primary detection unit that detects candidates for the target object from the image data by obtaining color information about an attribute of the candidate from the reference object detected by the reference detection unit, performing a histogram analysis on the color information of the attribute of the candidate from the reference object, and determining a reference attribute based on the histogram analysis for detecting the candidates for the target object;
   a secondary detection unit that specifies a portion including the target object from among the candidates, by using a correlation between a feature of the detected reference object and a feature of the candidates; and
   an output unit that outputs information representing the portion including the target object specified by the secondary detection unit, wherein
   a position of the target object is movable with time;
   the secondary detection unit specifies the portion including the target object, by means of a Bayesian network comprising a dynamic node based on information about motion of the target object, a static node based on information having no relation to the motion of the target object, and a candidate determination node; and
   the dynamic node and the static node are different from each other in a mode of connection to the candidate determination node,
   the secondary detection unit calculates a conditional state-transition probability of each node of the Bayesian network by the expression $$P(X_i^k | Pa(X_i)^j) = \frac{\alpha_{ijk} + N_{ijk}}{\sum_{k'} \alpha_{ijk'} + N_{ijk'}}$$

where $X_i^k$ denotes that a state of a random variable $X_i$ of the node is k, $Pa(Xi)^j$ represents as j a combination of states of the group of parent nodes $X_i$, $\alpha_{ijk}$ designates a hyper parameter of a Dirichlet distribution, and $N_{ijk}$ denotes a number of occurrences of a combination of states designated by (i, j, k).

2. An image analysis method for detecting a target object from image data, the method comprising:
   detecting a reference object included in the image data;
   detecting candidates for the target object from the image data by obtaining color information about an attribute of the candidate from the detected reference object;
   performing a histogram analysis on the color information of the attribute of the candidate from the detected reference object;
   determining a reference attribute based on the histogram analysis for detecting the candidates for the target object;
   specifying a portion including the target object from among the candidates, by using a correlation between a feature of the detected reference object and a feature of the candidates;
   specifying the portion including the target object, by means of a Bayesian network comprising a dynamic node based on information about motion of the target object, a static node based on information having no relation to the motion of the target object, and a candidate determination node, wherein
   a position of the target object is movable with time; and
   the dynamic node and the static node are different from each other in a mode connection to the candidate determination node; and
   outputting information representing the specified portion including the target object,
   calculating a conditional state-transition probability of each node of the Bayesian network by the expression $$P(X_i^k | Pa(X_i)^j) = \frac{\alpha_{ijk} + N_{ijk}}{\sum_{k'} \alpha_{ijk'} + N_{ijk'}}$$

where $X_i^k$ denotes that a state of a random variable $X_i$ of the node is k, $Pa(Xi)^j$ represents as j a combination of states of the group of parent nodes $X_i$, $\alpha_{ijk}$ designates a hyper parameter of a Dirichlet distribution, and $N_{ijk}$ denotes a number of occurrences of a combination of states designated by (i, j, k),
   wherein at least one of the steps are executed using a processor.

3. A non-transitory computer readable medium storing a program causing a computer to execute a process for detecting a target object from image data, the process comprising:
   detecting a reference object included in the image data;
   detecting candidates for the target object from the image data by obtaining color information about an attribute of the candidate from the detected reference object;
   performing a histogram analysis on the color information of the attribute of the candidate from the detected reference object;
   determining a reference attribute based on the histogram analysis for detecting the candidates for the target object;
   specifying a portion including the target object from among the candidates, by using a correlation between a feature of the detected reference object and a feature of the candidates;
   outputting information representing the specified portion including the target object;
   specifying the portion including the target object, by means of a Bayesian network comprising a dynamic node based on information about motion of the target object, a static node based on information having no relation to the motion of the target object, and a candidate determination node, a position of the target object is movable with time; and the dynamic node and the static node are different from each other in a mode of connection to the candidate determination node;
   calculating a conditional state-transition probability of each node of the Bayesian network by the expression $$P(X_i^k | Pa(X_i)^j) = \frac{\alpha_{ijk} + N_{ijk}}{\sum_{k'} \alpha_{ijk'} + N_{ijk'}}$$

where $X_i^k$ denotes that a state of a random variable $X_i$ of the node is k, $Pa(Xi)^j$ represents as j a combination of states of the group of parent nodes $X_i$, $\alpha_{ijk}$ designates a hyper parameter of a Dirichlet distribution, and $N_{ijk}$ denotes a number of occurrences of a combination of states designated by (i, j, k).

4. The image analyzer according to claim 1, wherein the reference object includes a human's face.

5. The image analyzer according to claim 4, wherein the target object includes a human's hand.

6. The image analysis method according to claim 2, wherein the reference object includes a human's face.

7. The image analysis method according to claim 6, wherein the target object includes a human's hand.

8. The non-transitory computer readable medium according to claim 3, wherein the reference object includes a human's face.

9. The non-transitory computer readable medium according to claim 8, wherein the target object includes a human's hand.

10. The image analyzer according to claim 1, further comprising:
an activation map generation section that sequentially selects a pixel in question and generates an activation map representing how closely the pixel in question matches a skin color, the activation map generation section using a frequency value of a bin corresponding to a pixel value of the pixel in question in the histogram analysis on the color information.

11. The image analysis method according to claim 2, further comprising:
sequentially selecting a pixel in question; and
generating an activation map representing how closely the pixel in question matches a skin color by using a frequency value of a bin corresponding to a pixel value of the pixel in question in the histogram analysis on the color information.

12. The non-transitory computer readable medium according to claim 4, further comprising:
sequentially selecting a pixel in question; and
generating an activation map representing how closely the pixel in question matches a skin color by using a frequency value of a bin corresponding to a pixel value of the pixel in question in the histogram analysis on the color information.

* * * * *